Feb. 19, 1963    R. L. BEVARD    3,077,992
MATERIAL HANDLING APPARATUS
Filed July 22, 1960    11 Sheets-Sheet 1

INVENTOR.
ROGER L. BEVARD
BY John W. Michael
ATTORNEY

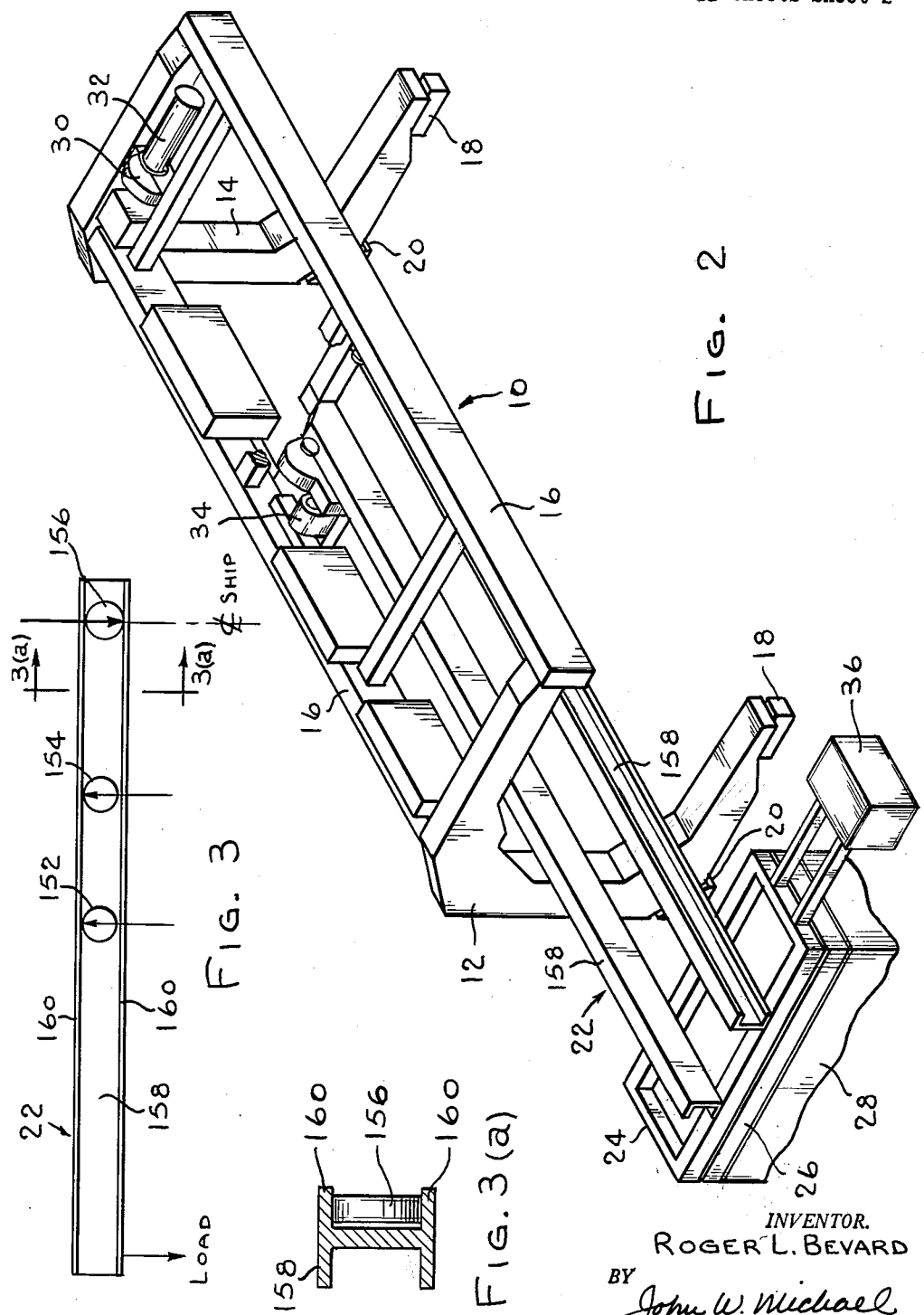

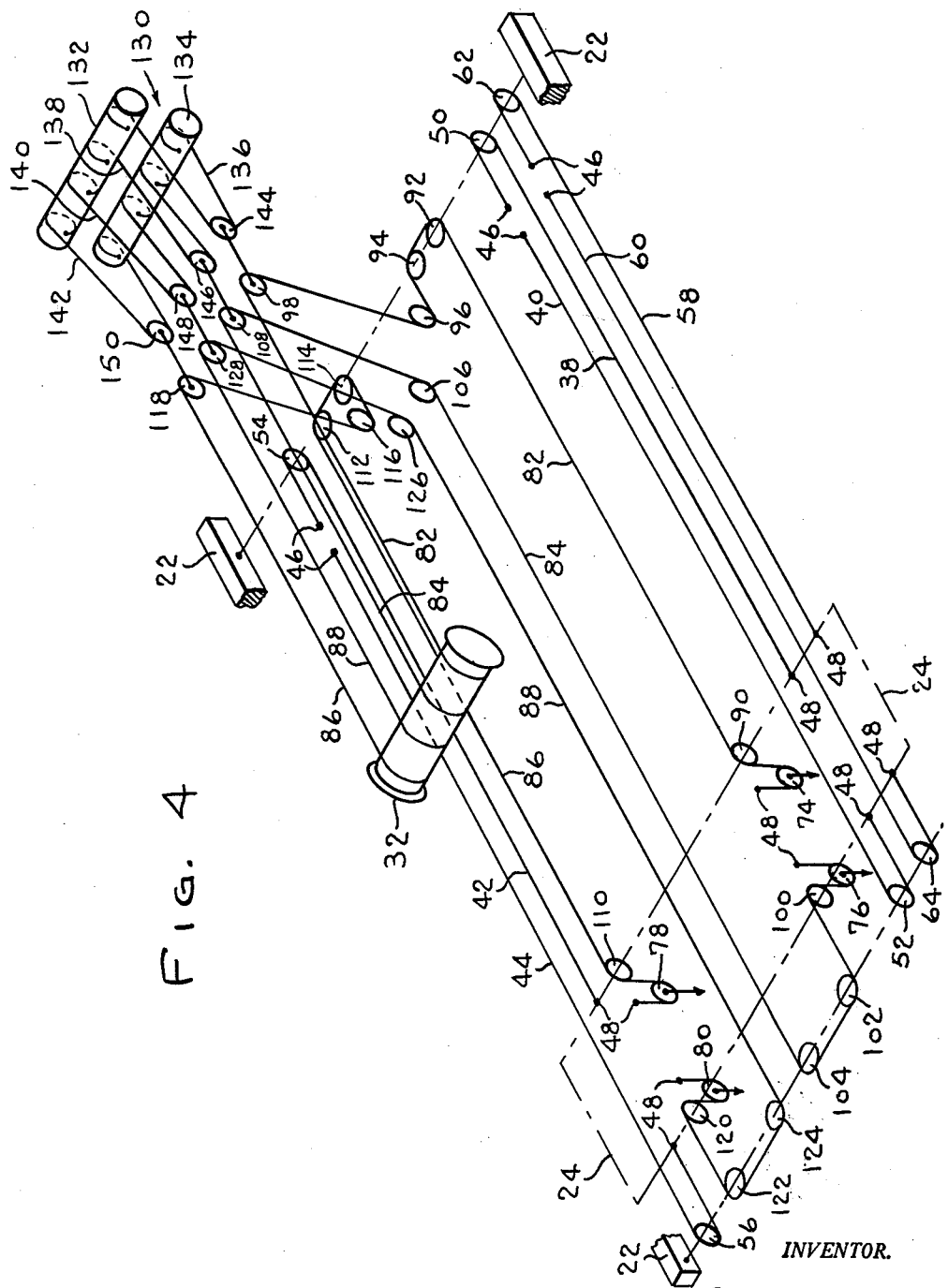

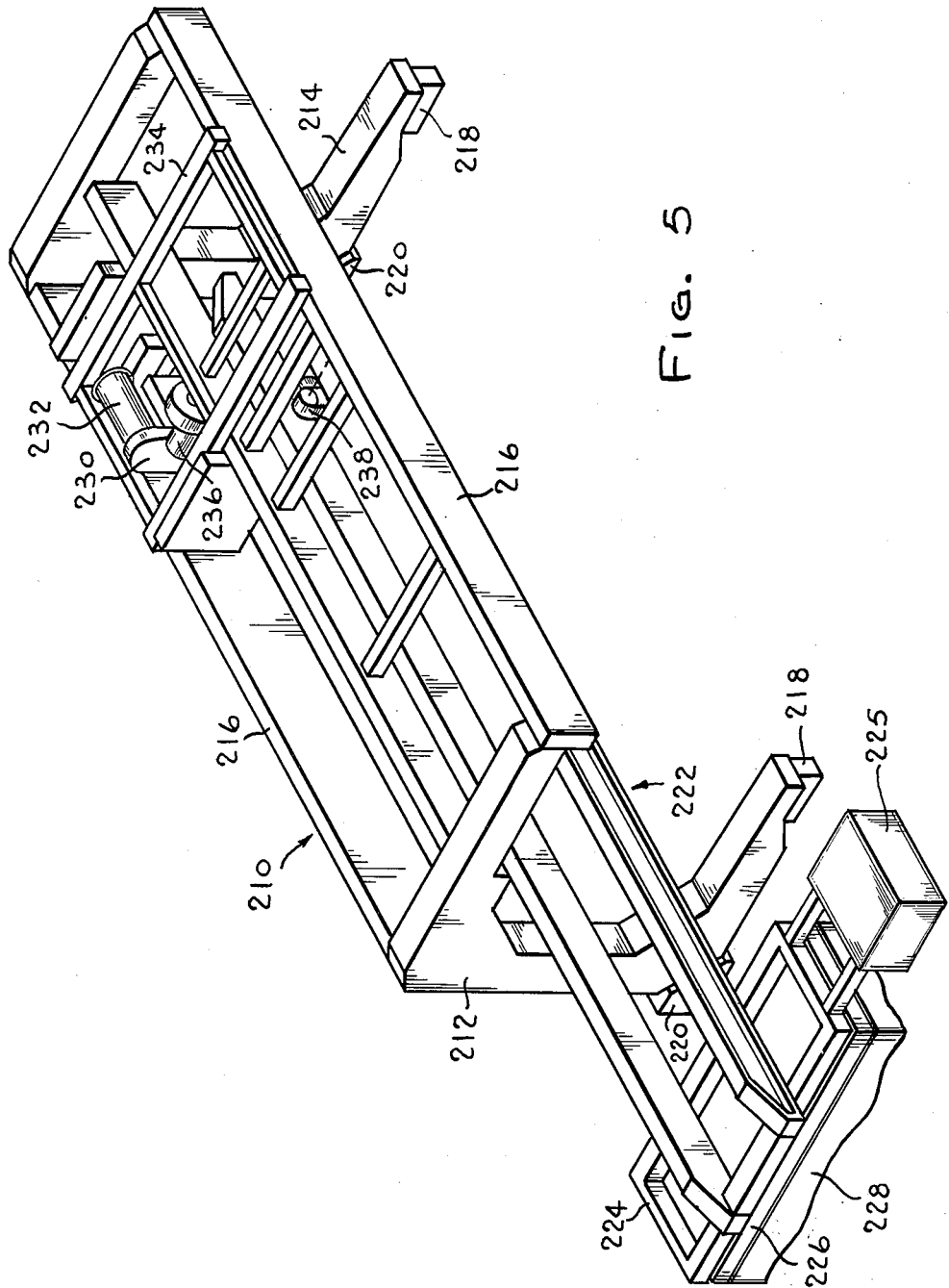

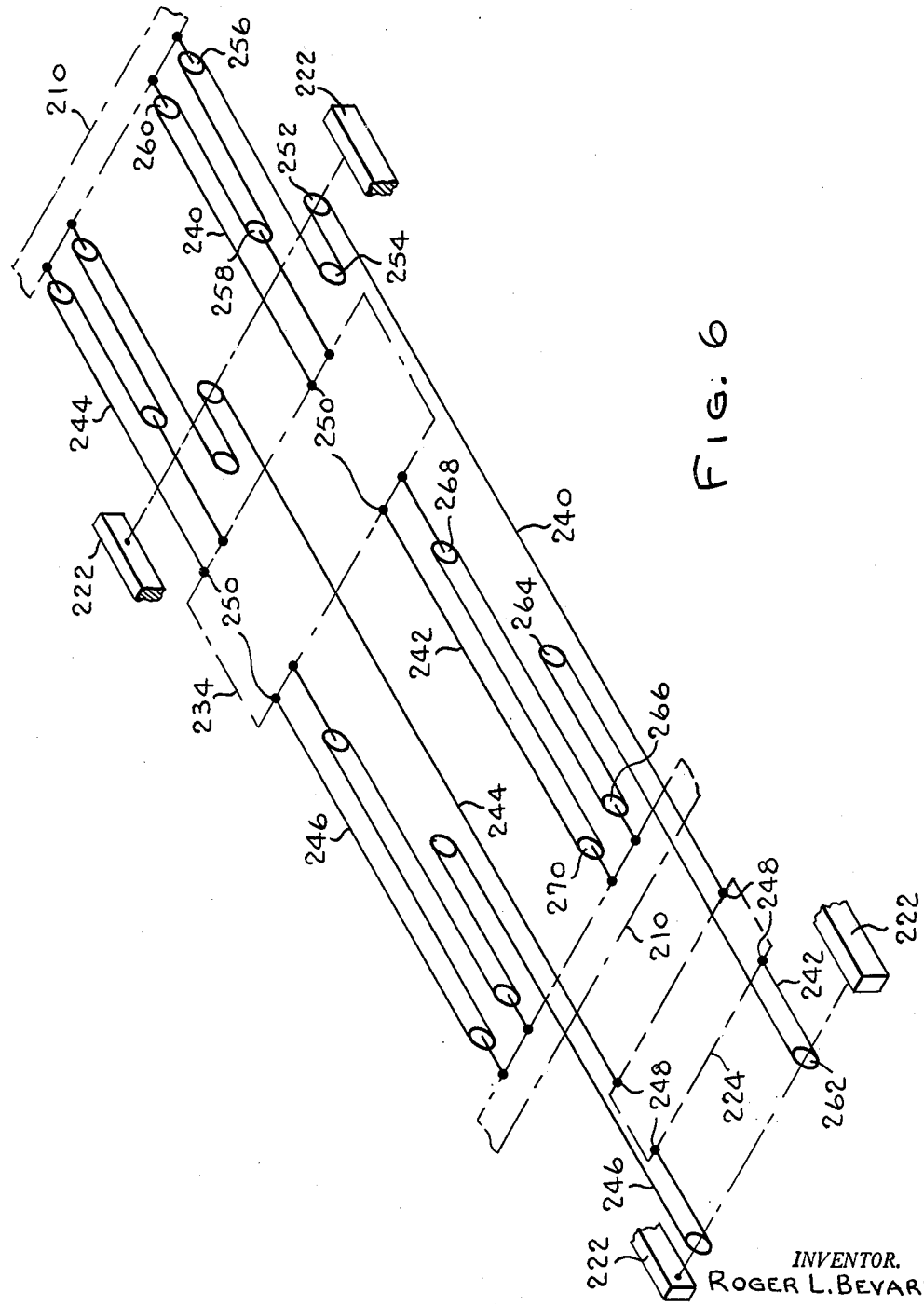

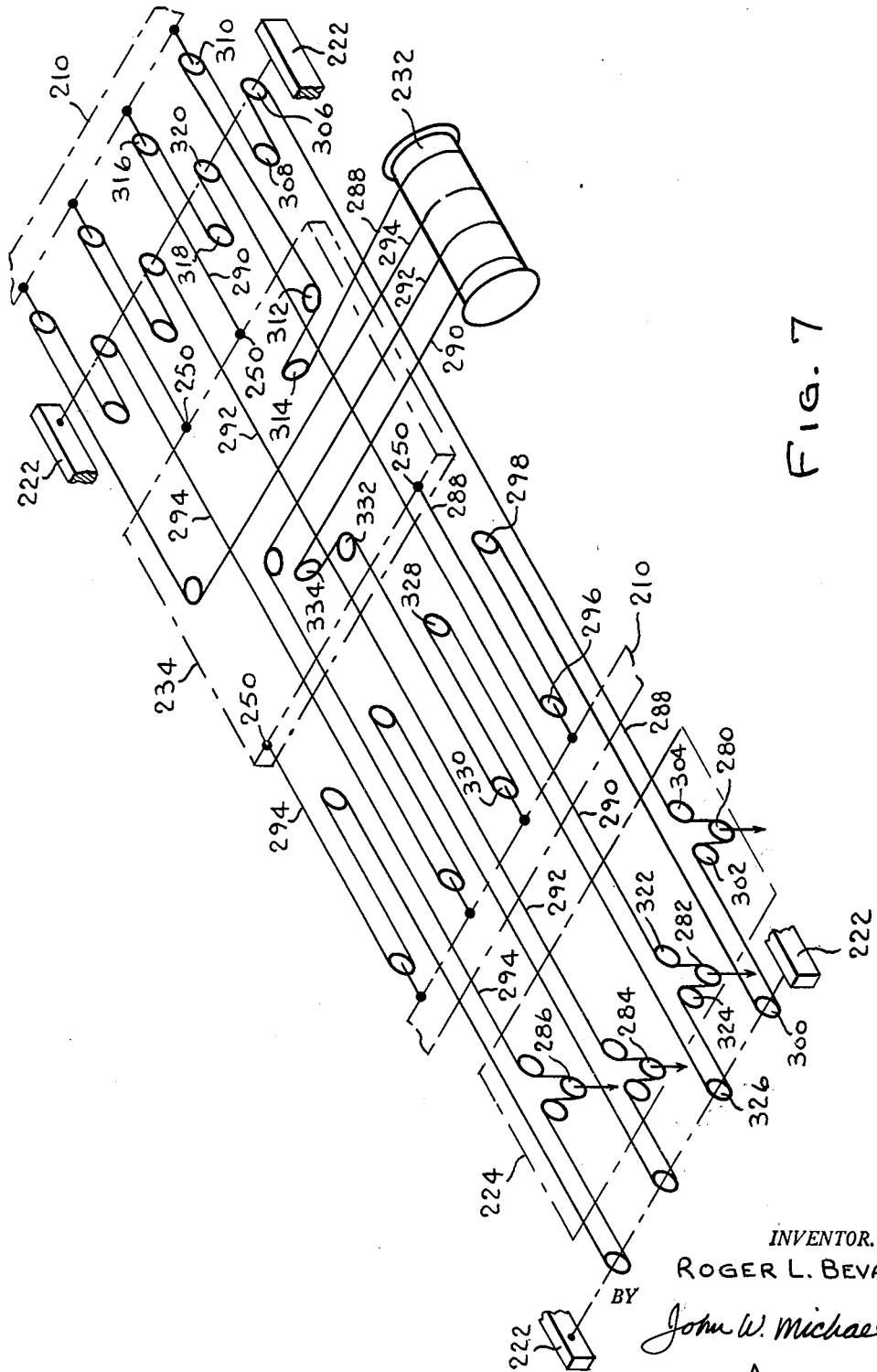

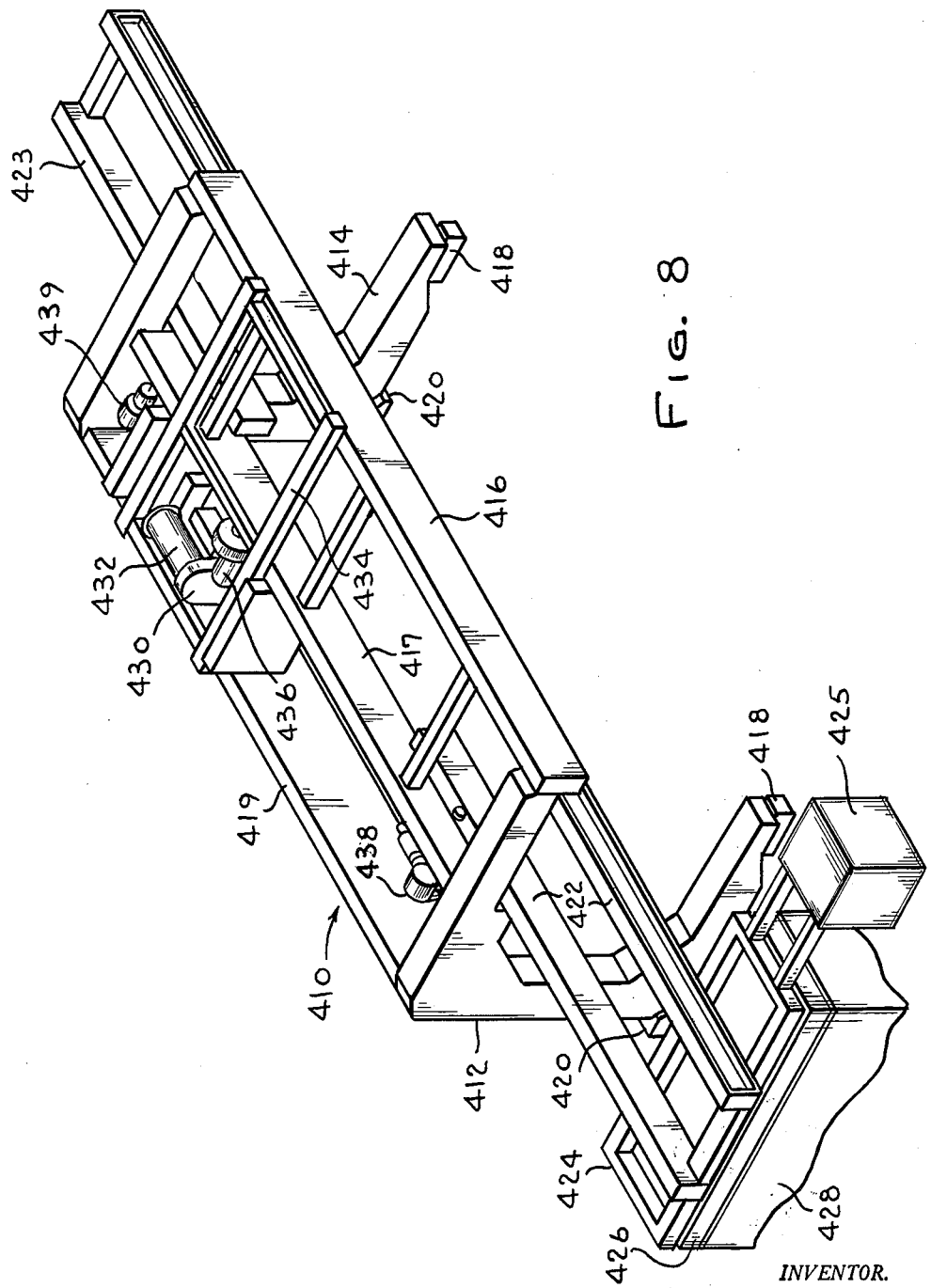

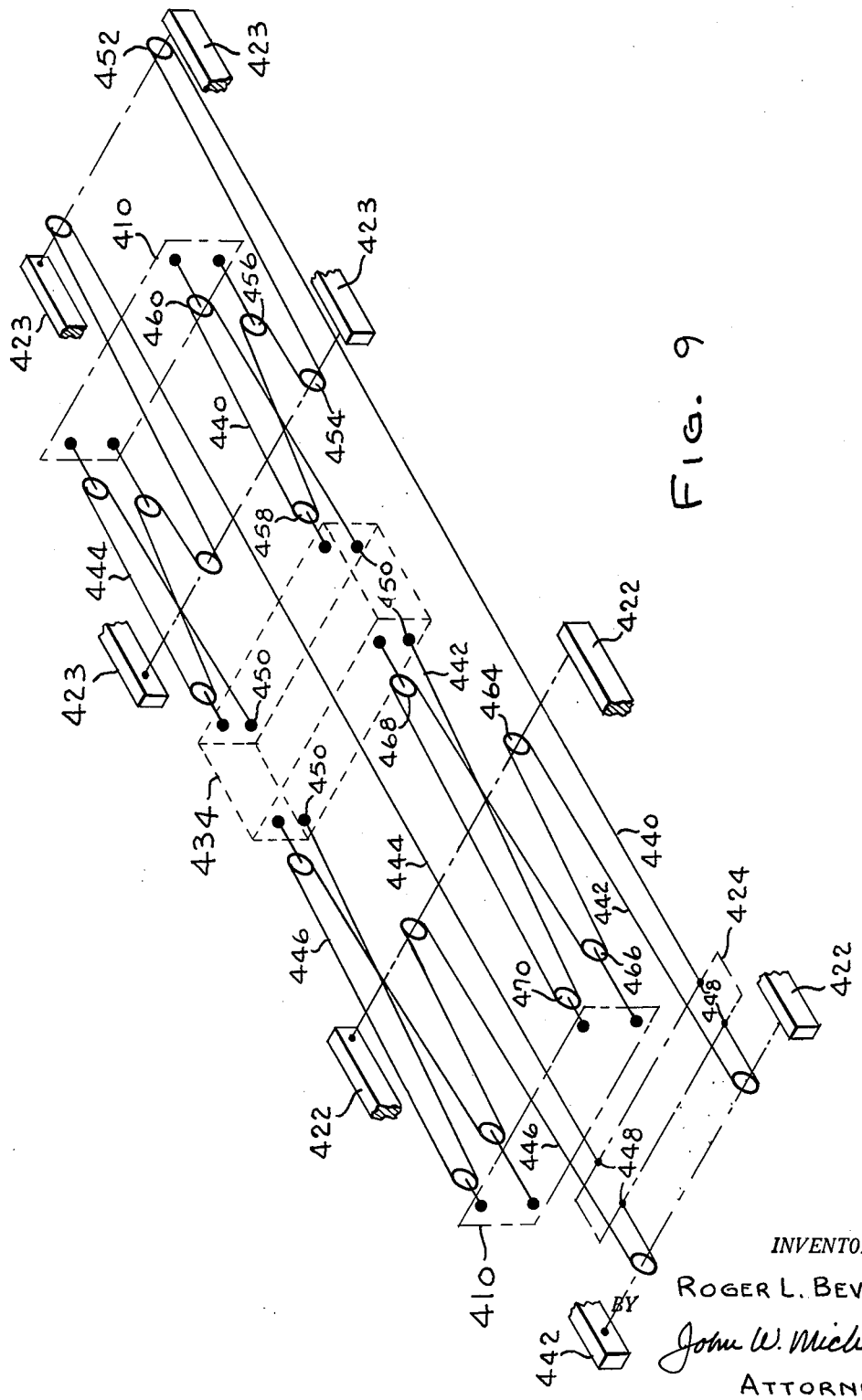

Feb. 19, 1963 R. L. BEVARD 3,077,992
MATERIAL HANDLING APPARATUS
Filed July 22, 1960 11 Sheets-Sheet 9

FIG. 10

INVENTOR.
ROGER L. BEVARD
BY
John W. Michael
ATTORNEY

Feb. 19, 1963 R. L. BEVARD 3,077,992
MATERIAL HANDLING APPARATUS
Filed July 22, 1960 11 Sheets-Sheet 10
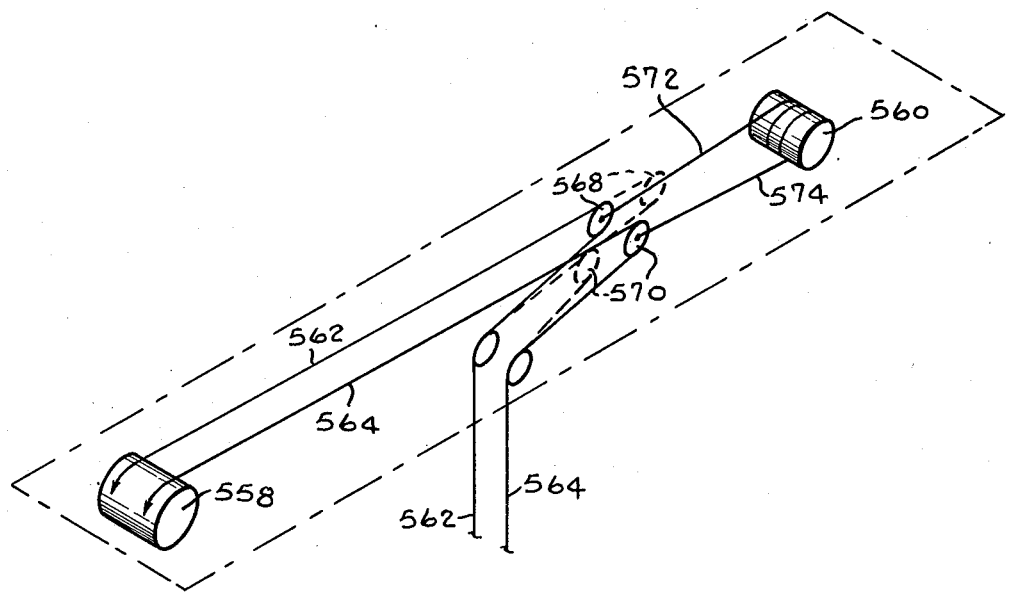
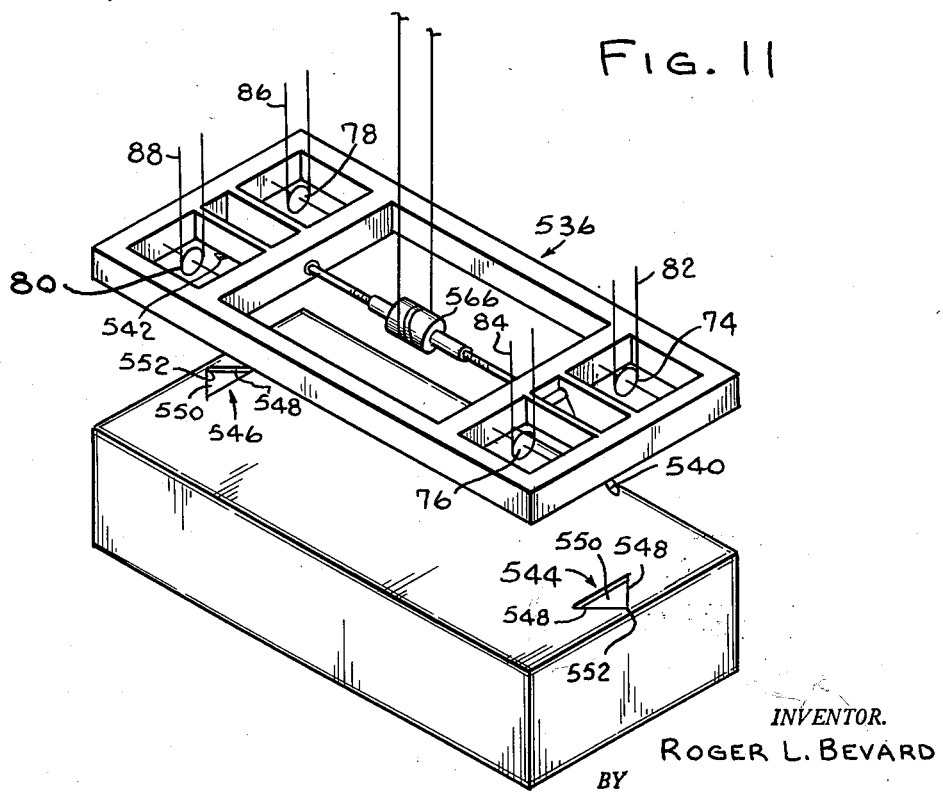
FIG. 11
INVENTOR.
ROGER L. BEVARD
BY
John W. Michael
ATTORNEY Feb. 19, 1963 R. L. BEVARD 3,077,992
MATERIAL HANDLING APPARATUS
Filed July 22, 1960 11 Sheets-Sheet 11
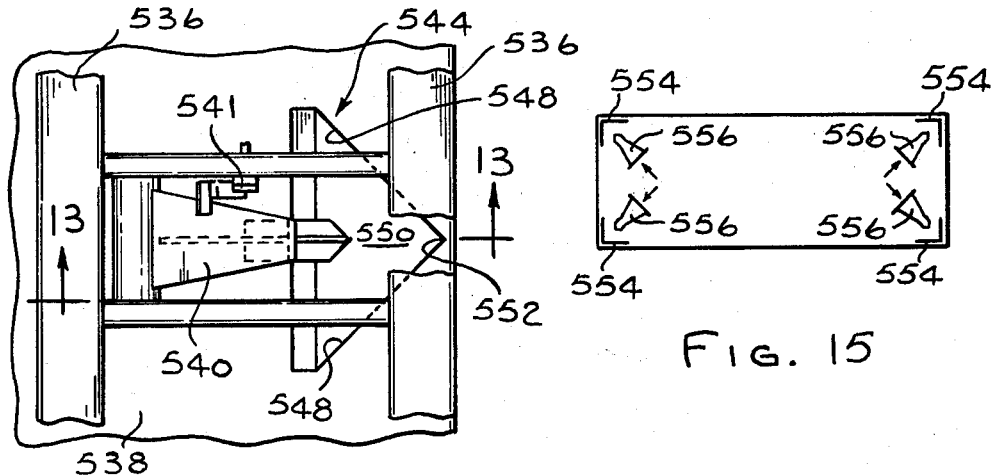
FIG. 12
FIG. 15
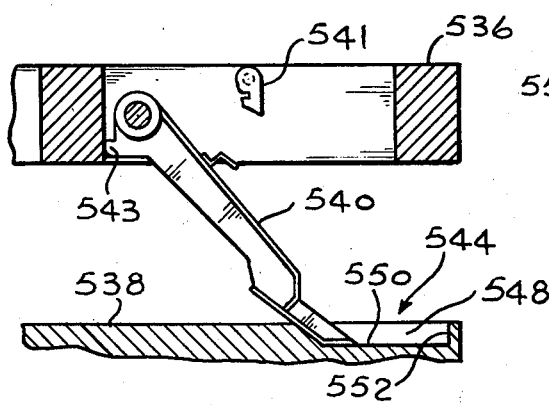
FIG. 13
FIG. 16
FIG. 17
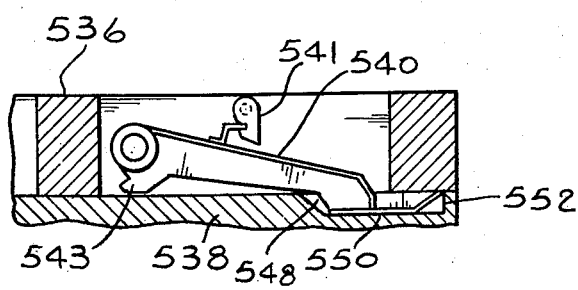
FIG. 14
INVENTOR.
ROGER L. BEVARD
BY
John W. Michael
ATTORNEY United States Patent Office 3,077,992
Patented Feb. 19, 1963

3,077,992
MATERIAL HANDLING APPARATUS
Roger L. Bevard, Iron Mountain, Mich., assignor to Lake Shore, Inc., Iron Mountain, Mich., a corporation of Michigan
Filed July 22, 1960, Ser. No. 44,607
24 Claims. (Cl. 212—15)

This invention relates to material handling apparatus and particularly to cargo handling apparatus for ships designed for handling containerized cargo.

The acceptance of "containerized cargo" by the shipping industry has been very widespread in recent years. The use of larger, heavier containers has made it necessary to not only provide wider hatches but to also provide handling apparatus which will reduce and compensate for listing of the vessel when loading and unloading. The subject matter of this application is specifically designed to meet these problems and at the same time provide an increased cargo handling rate to thereby minimize ship turnaround time.

One of the principal objects of this invention is to provide a means for tilting the load in either a fore and aft or athwartship direction to compensate for listing of the ship. A further refinement includes a means for counterbalancing the operating boom as the equipment is moved athwartship on the gantry.

Another object of the invention is to provide a simplified control cable arrangement from the operator's cab on the load trolley to the drive equipment on the gantry whereby the control cable will remain of constant length during operation of the equipment.

Another object is to provide an improved means for mounting the boom on the gantry frame whereby the reaction forces created by the load will be widely distributed on the support structure.

A further object is to provide an improved container carrying spreader frame having a relatively simple and reliable means for centering the frame with respect to a cargo container as the frame is lowered onto the container for attachment thereto.

The several objects of this invention are attained by apparatus which includes a gantry frame mounted on a ship and having a boom slidably mounted thereon adapted for athwartship movement outboard over the side of the ship. A load trolley having a container carrying spreader supported therefrom is mounted on the boom for athwartship travel thereon.

The load trolley is moved athwartship on the boom by a haulage means which includes pairs of constant length haulage cables dead-ended on the gantry, reeved over sheaves on opposite ends of the boom and then dead-ended on the load trolley. With this arrangement racking of the boom on the gantry will move the load trolley athwartship on the boom in the same direction as the boom is being moved. A separate drive means for the load trolley is thereby unnecessary.

The spreader frame is raised and lowered from the load trolley by a hoist means which includes a plurality of hoist cables having the spreader frame supported at one end thereof and being wound on a hoist drum mounted on the gantry at the other end. The hoist cables are reeved from the hoist drum out to sheaves on opposite ends of the boom and then back to sheaves on the load trolley.

As stated previously, when the boom is racked on the gantry the load trolley will be moved along the boom. With the above described combination of haulage and hoist reeving arrangements, the hoist cables will always remain of constant length as the boom is racked in either direction on the gantry.

A means for leveling the load to compensate for listing of the ship is provided. Such load leveling means includes a plurality of movably mounted leveling sheaves over which the hoist cables are reeved. A leveling control means is provided for causing relative movement of selected pairs of leveling sheaves to move the hoist cables with respect to each other and thereby tilt the load in either a fore and aft or athwartship direction.

Two modifications of the basic invention for counterbalancing the load as it is moved athwartship along the boom are shown in the drawings and described hereinafter. The first modification includes a counterweight trolley mounted for athwartship movement on the gantry and the second modification includes both a counterweight trolley and a divided boom arrangement whereby one boom can be positioned to counterbalance the other.

The improved support means for slidably mounting the boom on the gantry includes a plurality of rollers mounted on the frame. The boom is of channel or I-beam construction having parallel, vertically spaced flanges between which the support rollers on the gantry are positioned. The spacing of the flanges and the size of the support rollers are arranged so that only the roller at the center line of the ship will contact both the upper and lower flanges on the boom. The other rollers lie in contact with only the upper flange of the boom. This arrangement provides maximum distance between the reaction forces created by the load at the end of the boom and thus increases load capacity for any given size support rollers. An alternative roller arrangement (not shown) that could be employed to produce the same result would include a set of up-lift rollers at the center line of the ship in addition to roller 156 which then contacts only the upper flange.

An improved container carrying spreader is provided and can be used with any of the three embodiments of the invention. To properly align the spreader with the cargo container, a plurality of centering arms are pivotally mounted on the spreader frame and extend downwardly at an angle therefrom when in extended position. The centering arms are adapted for engagement with suitable guide means on the container to align the spreader with the container as the spreader is lowered into position for attachment thereto.

Other objects and advantages will be pointed out in, or be apparent from the specification and claims, as will obvious modifications of the several embodiments shown in the drawings, in which:

FIG. 2 is a partially schematic perspective view of a single cargo handling unit embodying the invention;

FIG. 3 is a fragmentary and partially schematic view of the boom showing an improved arrangement for slidably mounting the boom on the gantry frame;

FIG. 3(a) is a vertical sectional view taken along line 3(a)—3(a) of FIG. 3;

FIG. 4 is a simplified reeving diagram of the unit shown in FIG. 2;

FIG. 5 is a partially schematic perspective view showing a first modification of the invention wherein means is provided for partially counterbalancing the boom;

FIGS. 6 and 7 are simplified reeving diagrams showing the haulage and hoist reeving, respectively, for the unit shown in FIG. 5;

FIG. 8 is a partially schematic perspective view showing a second modification of the invention having divided booms for full counterbalance of the equipment;

FIGS. 9 and 10 are simplified reeving diagrams showing the haulage and hoist reeving, respectively, for the unit shown in FIG. 8;

FIG. 11 is a partially schematic perspective view of an improved container carrying spreader designed for use with any of the three embodiments shown in FIGS. 2–10;

FIG. 12 is a fragmentary top plan view of the container carrying spreader (with a part of the frame broken away) showing the details of one centering arm (in extended position);

FIG. 13 is a sectional view taken along line 13—13 of FIG. 12;

FIG. 14 is a sectional view similar to FIG. 13 except with the spreader positioned on top of a container with the centering arm retracted; and FIGS. 15, 16 and 17 are diagrammatic views showing a few of the alternating arrangements of centering arms and guide means which can be employed.

Figure 1:
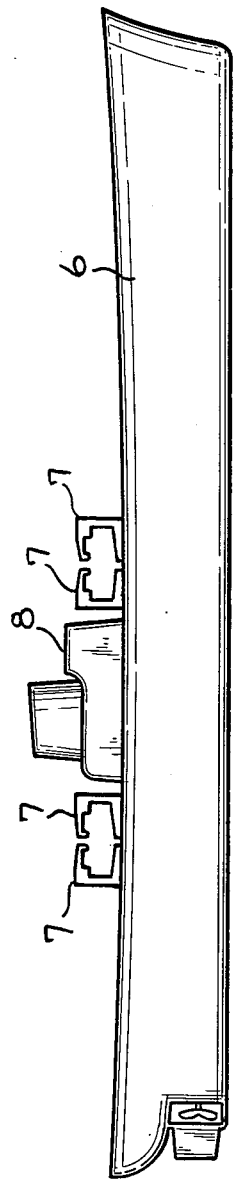
FIGS. 1 and 1(a) are side elevation and top plan views, respectively, of a ship equipped with a cargo handling apparatus constructed in accordance with this invention.
Figure 1A:
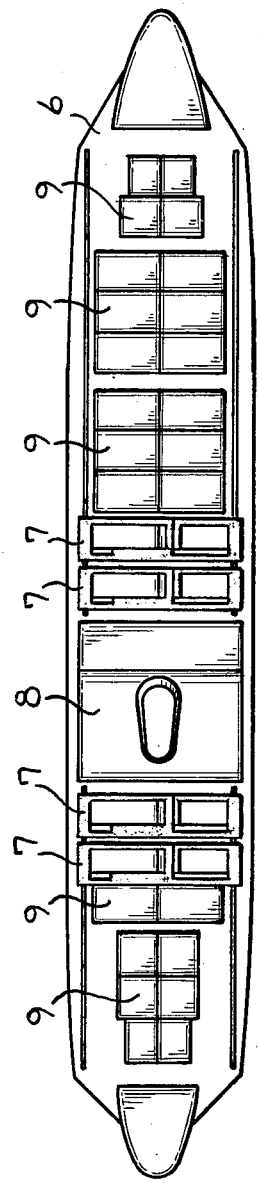

As shown in FIGS. 1 and 1(a), an average size freighter 6 is equipped with a total of from two to four units 7 located fore and aft of the ship's superstructure 8 as shown. A single unit of C frame construction, such as that shown in FIG. 2, is designed for fore and aft movement on the ship's deck between hatches 9. A single C frame unit (FIG. 2) is designed for handling containers of from 17 to 24 feet in length and is rated at from 20 to 25 long ton capacity. By using two units facing each other and working in tandem large bulky objects such as long tanks or pipe for deck cargo may be handled. Hoisting capacity is doubled. For handling maximum length containers from 35 to 40 feet long, a closed sided gantry of symmetrical design (not shown) may be employed.

Referring now to units 7 in detail, FIG. 2 shows one embodiment of the invention which includes a gantry frame 10 comprising a pair of C-shaped end members 12 and 14 interconnected by cross supports 16, 16 as shown. Gantry frame 10 is mounted for fore and aft movement on the deck of a ship by means of pairs of trucks 18, 20 (shown schematically) mounted on the bottom of C-shaped members 12, 14.

A boom 22 is slidably supported on the underside of the upper portion of frame 10 for athwartship movement outboard on either side of the ship. An improved mounting arrangement for the boom to better distribute the reaction forces created by the load is shown in detail in FIG. 3 and will be described hereinafter.

A load trolley 24 having a container carrying spreader 26 supported therefrom is mounted on boom 22 for athwartship movement along the boom. Athwartship movement of trolley 24 along the boom is provided by a haulage reeving arrangement (FIG. 4) presently to be described. Spreader 26 is adapted for detachable attachment to a cargo container 28 (boxcar, truck body, etc.) and is hoisted and lowered to and from trolley 24 by a hoist cable reeving arrangement (FIG. 4) presently to be described. A container carrying spreader equipped with a novel means for centering the spreader with respect to the container is shown in detail in FIGS. 11–16 and will be described hereinafter.

A hoist motor 30 and drum 32 for raising and lowering spreader 26 and a haulage motor drive unit 34 for racking boom 22 are mounted on gantry 10. A suitable drive means (not shown) for moving gantry frame 10 fore and aft on the ship's deck can also be mounted on the gantry.

An operator's cab 36 is mounted on load trolley 24 opposite the open sides of C-shaped members 12, 14. This arrangement gives the operator optimum visibility as a container 28 is lowered in or out of a hatch and to or from a dock after being moved athwartship between one or the other of C members 12, 14 and, if necessary, fore and aft on the deck. It is noted that each unit is completely self-contained and ready for operation as soon as the ship reaches port, there being no removal and release of stowing locks required before the equipment is operable.

Referring now to the simplified hoist and haulage reeving arrangement shown in FIG. 4, it is seen that the load trolley 24 is moved athwartship along boom 22 by means of pairs of haulage cables 38, 40 and 42, 44. For clarity of explanation, all points at which a cable is dead-ended on gantry 10 are numbered 46 and all points at which a cable is dead-ended on load trolley 24 are numbered 48. Cable 38 is dead-ended on the load trolley at a point 48 and is reeved around a sheave 50 at the right hand end of the boom and is then dead-ended on the gantry at a point 46. Cable 40 is fastened at one end to the gantry and is reeved around a sheave 52 at the left hand end of the boom and is then dead-ended on the trolley. Cables 42 and 44 on the other leg of the boom are similarly reeved on sheaves 54 and 56 mounted on opposite ends of the boom. Thus, it is seen that when boom 22 is racked on the gantry by means of drive unit 34 (FIG. 2), trolley 24 will be moved along the boom by the means of cables 38, 40 and 42, 44. For example, if the boom were driven to the right as viewed in FIGS. 2 and 4, cables 38 and 42 will pull trolley 24 to the right along the boom. At the same time, the movement of the trolley to the right will pull on cables 40 and 44 to take up the slack as boom sheaves 52 and 56 move to the right.

With the above described haulage reeving arrangement, trolley movement is dependent on boom movement, i.e. the trolley 24 cannot be moved without moving boom 22. This arrangement wherein drive unit 34 drives both the boom and the trolley, completely eliminates the necessity for separate boom and trolley drives. If, however, independent movement is desired, such operation could be provided quite simply by an additional drive unit (not shown) mounted on the gantry and operatively connected to ends 46 of cables 38, 40, 42 and 44.

As stated previously, it is preferable that the operator's cab 36 be mounted on the load trolley. With such arrangement the control cable from the cab must extend from a point (cab 36) which moves with respect to the drive units (and associated control equipment) mounted on gantry frame 10. In the past this arrangement has necessitated the use of a control circuit collector system or a take-up mechanism of some type. The present invention presents an improved solution to this problem wherein either or both control cables 58 and 60 are provided as shown in FIG. 4. Control cable 58 of constant length extends from trolley 24 to the right hand end of boom 22 where it is reeved around a sheave 62 and then back to the left for connection to the equipment mounted on the gantry. Thus, as the boom is racked causing the trolley to move thereon in either direction, control cable 58 will follow the movement of the trolley with its length always remaining constant. Control cable 60 (also of constant length) extends from trolley 24 to the left hand end of boom 22 where it is reeved around a sheave 64 and then back to the right for connection to the equipment mounted on the gantry at a point 46. Cable 60, therefore, follows the movement of the trolley on the boom in much the same manner as does cable 58. As indicated above, either or both control cable 58 and 60 can be provided. The use of one or the other or both will depend on the specific design of the particular cargo handling apparatus involved.

From the foregoing it will be appreciated that since only boom 22 and load trolley 24 need be extended outbound of the ship to load and unload cargo, objectionable listing of the vessel is kept to a minimum. Some listing does occur, however, making it desirable to provide a load leveling means for compensating for such listing and thereby facilitate stacking cargo containers on the deck and in some instances to facilitate entrance of the containers into the guides aboard ship. Such a means is shown in FIG. 4 as part of the hoist reeving diagram illustrated thereon.

The container carrying spreader 26 (FIG. 2) is supported from load trolley 24 by four load sheaves 74, 76, 78, 80 mounted on the spreader frame. Load sheaves 74—80 are supported by hoist cables 82, 84, 86, 88, respectively, which are tied at one end to the trolley (points 48) and at the other end to hoist drum 32 on the gantry. Starting at the load trolley, cable 82 is reeved over load sheave 74, a trolley sheave 90, boom sheaves 92, 94, gantry sheaves 96, 98, and then to hoist drum 32. Cable 84 is reeved over load sheave 76, a trolley sheave 100, boom sheaves 102, 104 and gantry sheaves 106, 108 and then to the hoist drum. Cable 86 is reeved over load sheave 78, a trolley sheave 110, boom sheaves 112, 114 and gantry sheaves 116, 118. Cable 88 is reeved over load sheave 80, a trolley sheave 120, boom sheaves 122, 124 and gantry sheaves 126, 128. With this arrangement it is seen that clockwise rotation of hoist drum 32 will cause load sheaves 74—80 to be lowered while counterclockwise rotation of the drum will raise the load. It is noted that with the haulage reeving arrangement previously described, load trolley 24 will move on boom 22 as the boom is moved on the gantry. Thus, it is seen that by reeving hoist cables 82—88 around pairs of boom sheaves mounted on opposite ends of the boom, such hoist cables will always remain of constant length as boom 22 is moved in either direction causing load trolley 24 to travel on the boom in the same direction.

To level (or tilt) the load in either a fore and aft or athwartship direction, a leveling means indicated generally by numeral 130 is provided. Leveling means 130 includes a pair of leveling drums or lever arms 132, 134 rotatably mounted on gantry frame 10, and operatively connected to hoist cables 82—88 by leveling control cables 136, 138, 140, 142 reeved over leveling sheaves 144, 146, 148, 150, respectively, as shown. Sheaves 144—150 are mounted on movable axes and are tied to gantry sheaves 98—118, respectively, which are also mounted on movable axes.

As shown in FIG. 4, leveling control cables 136—142 are wound on drums 132, 134 in such a manner so as to provide fore and aft tilting of the load when one drum is rotated and athwartship tilting of the load by rotating the other. Assume for example that the ship is out of trim slightly in a fore and aft direction due to an unequal cargo distribution condition during loading. With the container carrying spreader tilted slightly with respect to a container on the dock, the spreader can be leveled with respect to such container by rotating drum 132 in one direction or the other as required. For example, clockwise rotation of drum 132 will move leveling sheaves 144, 146 to the left and sheaves 148, 150 to the right which, in turn, will lower load sheaves 74, 76 and raise load sheaves 78, 80. After the spreader is fastened to the container and the load is raised from the dock, the proper tilt can be restored to the load (to facilitate stacking in the hold) by rotating drum 132 back to its former position. Athwartship leveling and tilting is produced by rotating drum 134 which operates to raise and lower pairs of load sheaves 74, 78 and 76, 80 together.

It is noted that the leveling arrangement of this invention does not rely on the force of gravity to level the container but instead provides a controllable means for tilting as desired.

As shown in FIGS. 3 and 3(a), boom 22 is slidably mounted for athwartship movement on gantry frame 10 by a plurality of support rollers 152, 154, 156. The two parallel legs 158 of boom 22 are of channel or I-beam construction having parallel, horizontally extending flanges 160 between which the support rollers on the gantry are positioned. Outboard rollers 152, 154 are of slightly smaller diameter than roller 156 (at center line of ship) so that only center roller 156 [FIG. 3(a)] will contact both upper and lower flanges 160 of the boom. This arrangement provides maximum distance between the reaction forces created by the load at the end of the boom. Thus, as shown by the arrows on FIG. 3 the reaction forces at all outboard rollers will always be in a direction opposite that at the center roller 156 which contacts both flanges of the boom. This arrangement increases load capacity for any given size roller support and number. As an alternative to the above described arrangement, center roller 156 can be altered so that it will contact the upper flange only and an up-lift roller (not shown) is added which contacts only the lower flange of the boom.

*Counterbalanced Arrangement I*

A first modification of the present invention is shown in FIGS. 5–7. This embodiment includes (FIG. 5) a gantry frame 210, comprising a pair of C-shaped end members 212, 214 interconnected by cross supports 216, 216, as shown. Gantry frame 210 is mounted for fore and aft movement on the deck by pairs of trucks 218, 220 (shown schematically) mounted on the bottom of C-members 212, 214.

A boom 222 is slidably supported on the underside of the upper portion of gantry frame 210 for athwartship travel outboard on either side of a ship. An improved mounting arrangement for the boom is shown in FIG. 3 and described previously.

A load trolley 224 having an operator's cab 225 and a container carrying spreader 226 supported therefrom is mounted on boom 222 for athwartship movement along the boom. Spreader 226 is adapted for detachable connection to a cargo container 228 and can be hoisted and lowered to and from trolley 224 by a hoist cable arrangement (FIG. 7) described hereinafter.

A hoist motor 230 and drum 232 for raising and lowering spreader 226 are mounted on a counterweight trolley 234 which, in turn, is mounted for athwartship travel on gantry frame 210. Trolley 234 is moved athwartship on the gantry by means of a rack and pinion (not shown) driven by a drive motor 236 mounted on the counterweight trolley. The mounting of the hoist motor and drum on the counterweight trolley simplifies the reeving required and provides better counterbalance for the load. However, where the situation requires the hoist machinery can be mounted on the gantry frame.

Boom 222 is racked on gantry 10 by a drive motor 238 mounted on the gantry and the entire unit can be moved fore and aft on gantry trucks 218, 220 by any suitable drive means (not shown) also mounted on the gantry.

The haulage reeving arrangement for moving load trolley 224 along the boom when either boom 222 or counterweight trolley 234 is racked on the gantry is shown on FIG. 6. Referring to FIG. 6, it is seen that load trolley 224 is moved athwartship along boom 222 by pairs of identically reeved haulage cables 240, 242 and 244, 246. Since each pair of haulage cables is reeved in an identical manner only one such pair will be described. For clarity of explanation, all points at which a cable is dead-ended on load trolley 224 and counterweight trolley 234 are numbered 248 and 250, respectively. Cable 240 is dead-ended on trolley 224 at a point 248, reeved over a sheave 252 at the right hand end of the boom and then reeved back and forth over sheaves 254, 256 on the gantry, a sheave 258 on counterweight trolley 234, a sheave 260 on the gantry and then back to the counterweight trolley where it is dead-ended at a point 250. Cable 242 is dead-ended on load trolley 224, reeved over a sheave 262 at the left hand end of the boom and reeved back and forth over sheaves 264, 266 on the gantry, a sheave 268 on counterweight trolley 234, a sheave 270 on the gantry and then back to the counterweight trolley where it is dead-ended at a point 250. As stated previously, cables 244 and 248 on the other leg of the boom are reeved in an identical manner.

From the foregoing it is then that when boom 222 is racked on the gantry to its desired operating position by means of drive unit 238 (with counterweight trolley stationary), load trolley 224 will be moved (in the same direction) along the boom by pairs of haulage cables 240, 242 and 244, 246. This relative movement of load trolley and boom upon racking of the boom is not particularly useful in this arrangement but serves to simplify the reeving to some extent. Once boom 222 has been positioned as desired, load trolley 224 is moved thereon for loading and unloading cargo by moving counterweight trolley 234. For example, assume that with the boom extended it is desired to move the load trolley to the right on the boom (as viewed in FIG. 6) to unload a container from the ship's hold. This is accomplished by driving counterweight trolley 234 to the left by means of drive motor 236. When trolley 234 is thus driven, cables 240 and 244 will pull load trolley 224 to the right to the proper position for lowering the spreader frame 226 into the hold. It is noted (with respect to cable 240) that the combined action of gantry sheaves 254, 256, 260 and trolley sheave 258 provides a motion multiplier means whereby the movement of the load trolley on the boom is three times as great as the movement of the counterweight trolley on the gantry.

After a container is hoisted from the hold, load trolley is returned to the left end of the boom for unloading by driving counterweight trolley back to the right. This movement is caused by cables 242 and 246 which pull the load trolley to the left with a 3 to 1 multiplication of movement. Thus, it is seen that as a load is moved athwartship from the center line of the ship in one direction, counterweight trolley 234 (with hoist and drive machinery 230, 232, 236 mounted thereon) will move athwartship in the other direction to at least partially counterbalance the load and thus reduce the tendency of the ship to list.

A constant length control cable (not shown) from operator's cab 225 (on load trolley 224) to the drive equipment on counterweight trolley 234 can be reeved from the load trolley to the counterweight trolley by using the same reeving arrangement employed by either haulage cable 240 or 242. Other means such as a conventional take-up device or a light weight synchronized boom can be employed to run a control cable from the cab to boom motor drive 238 on the gantry and to provide control power from the ship to the cab.

Referring now to the simplified hoist reeving diagram shown in FIG. 7, container carrying spreader 226 (FIG. 5) is supported from load trolley 224 by four load sheaves 280, 282, 284, 286 mounted on the spreader frame. Load sheaves 280—286 are supported by hoist cables 288, 290, 292, 294, respectively, which are tied at one end to counterweight trolley 234 (points 250) and at the other end to hoist drum 232.

Pairs of hoist cables 288, 294 and 290, 292 are reeved from the counterweight trolley to the hoist drum in an almost identical manner and thus the reeving for only one cable of each pair will be described. Starting at counterweight trolley 234, cable 288 is reeved over sheaves 296, 298 on the gantry, a sheave 300 on the left hand end of the boom, a sheave 302 on the load trolley, load sheave 280, a second sheave 304 on the load trolley, a sheave 306 on the right hand end of the boom, sheaves 308, 310 on the gantry, sheaves 312, 314 on the counterweight trolley, and then to hoist drum 232. Cable 290, starting at the counterweight trolley, is reeved over sheaves 316, 318 on the gantry, sheave 320 on the right hand end of the boom, a sheave 322 on the load trolley, load sheave 282, a second sheave 324 on the load trolley, a sheave 326 on the left hand end of the boom, sheaves 328, 330 on the gantry, sheaves 332, 334 on the counterweight trolley, and then to the hoist drum.

With the foregoing arrangement (FIG. 7) it will be apparent that counterclockwise rotation of drum 232 will cause load sheaves 280—286 to be lowered while clockwise rotation of the drum will raise the load. It is noted that with the haulage reeving arrangement (FIG. 6) previously described, load trolley 224 will move on boom 222 when either the boom or counterweight trolley 234 is racked on the gantry. By reeving hoist cables 288—294 over a pair of load trolley sheaves and then in opposite directions to a boom sheave at each end of the boom, such hoist cables will always remain of constant length (and thus keep the axis of the load sheaves vertically stationary) when either the boom or the counterweight trolley is moved and irrespective of the relative degree of movement between the load and counterweight trolleys.

To level (or tilt) the load in either a fore and aft or athwartship direction, a leveling means (130) such as that shown in FIG. 4 and described previously can be provided. Such a leveling means could be made to operate on the FIG. 7 arrangement by slidably mounting any set of axially aligned gantry sheaves such as 298, 328 (and the other two unnumbered sheaves aligned therewith) and then fastening such slidably mounted sheaves to a set of leveling sheaves and drums as shown in FIG. 4.

*Counterbalanced Arrangement II*

A second modification of the present invention is shown in FIGS. 8–10. This embodiment (FIG. 8) includes a gantry frame 410 comprising a pair of C-shaped end members 412, 414 interconnected by cross supports 416, 417 and 419, as shown. Gantry frame 410 is mounted for fore and aft movement on the deck by pairs of trucks 418, 420 (shown schematically) mounted on the bottom of C-members 412, 414.

A pair of divided booms 422, 423 are slidably supported on the underside of the upper portion of gantry frame 410 for athwartship travel outboard on either side of a ship. A load trolley 424 having an operator's cab 425 and a container carrying spreader 426 supported therefrom is mounted on boom 422 for athwartship travel along the boom. Trolley 424 is adapted for travel from one boom to the other for use on either side of the ship by a set of trolley rollers (not shown) mounted on gantry cross supports 416, 417. Spreader 426 is adapted for detachable attachment to a cargo container 428 and can be hoisted and lowered to and from trolley 424 by a hoist cable arrangement (FIG. 10) described hereinafter.

A hoist motor 430 and drum 432 for raising and lowering spreader 426 are mounted on a counterweight trolley 434 which, in turn, is mounted for athwartship travel on gantry frame 410. Trolley 434 is driven athwartship on the gantry by means of a rack and pinion (not shown) powered by a motor drive unit 436 mounted on the counterweight trolley. By mounting the hoist motor and drum on the counterweight trolley, the hoist reeving is simplified and a better counterbalance for the load is provided. It should be understood, however, that where the situation requires the hoist machinery can be mounted on the gantry frame.

Booms 422 and 423 are racked on the gantry by motor drive units 438 and 439, respectively, mounted on the gantry. The entire unit can be moved fore and aft on the deck by any suitable drive means (not shown) also mounted on the gantry.

The haulage reeving arrangement for moving load trolley 424 along one of the booms when counterweight trolley 434 is racked on the gantry is shown in FIG. 9. As shown in FIG. 9, load trolley 424 is moved athwartship along booms 422 and 423 by pairs of identically reeved haulage cables 440, 442 and 444, 446. Since each pair of haulage cables is reeved in an identical manner only one such pair will be described. For clarity of explanation, all points at which a cable is dead-ended on load trolley 424 and counterweight trolley 434 are numbered 448 and 450, respectively.

Cable 440 is dead-ended on load trolley 424 at a point 448, reeved over sheaves 452, 454 at the right and left hand ends of boom 423, respectively, and then reeved back and forth over a sheave 456 on the gantry, a sheave 458 on counterweight trolley 434, a sheave 460 on the gantry and then back to the counterweight trolley where it is dead-ended at a point 450. Cable 442 is dead-ended on load trolley 424, reeved over sheaves 462, 464 at left and right hand ends of boom 422, respectively, and then reeved back and forth over a sheave 466 on the gantry, a sheave 468 on counterweight trolley 434, a sheave 470 on the gantry and then back to the counterweight trolley where it is dead-ended at a point 450.

From the foregoing it is seen that when either boom 422 or 423 is racked on the gantry to its desired operating position (with counterweight trolley 434 stationary), the position of load trolley 424 will not be affected except with respect to its relative position with the particular boom which is moved. By using a double boom, one boom can be used to counterbalance the weight of the other. Suppose, for example, that it was desired to use the left hand boom 422 (as viewed in FIG. 9) to load or unload cargo. In such event boom 422 would be racked outwardly to the desired operating position by motor drive 438. Right hand boom 439 could then be racked outwardly to a similar position by motor drive 439 to thereby counterbalance boom 422.

Once the booms have been positioned as desired, load trolley 424 is moved athwartship along one boom or the other for loading and unloading cargo by driving counterweight trolley 434 in one athwartship direction or the other. Assume, for example, that with the load trolley at the end of boom 422 it is desired to move the load trolley to the right on boom 422 (as viewed in FIG. 9) to unload a container from the ship's hold. This is accomplished by driving counterweight trolley 434 to the left by means of motor drive 436. When trolley 434 is thus driven, cables 440 and 444 will pull load trolley 424 to the right to the proper position for lowering the spreader frame 426 into the hold. It is noted that the combined action of gantry sheaves 456, 460 and counterweight trolley sheave 458 provides a motion multiplier means whereby the movement of the load trolley on the boom is three times as great as the movement of the counterweight trolley on the gantry.

After a container is hoisted from the hold, load trolley is returned to the left end of boom 422 for unloading by driving counterweight trolley back to the right. The load trolley is moved by cables 442 and 446 which pull the trolley to the left with a 3 to 1 multiplication of movement. Thus, it is seen that as a load is moved athwartship from the center line of the ship in one direction, counterweight trolley 434 (with hoist and drive machinery 230, 232, 236 mounted thereon) will travel athwartship in the other direction to thereby counterbalance the load and thus reduce the tendency of the ship to list.

A constant length control cable (such as that shown on FIG. 4) from the operator's cab on load trolley 424 to the motor drive units on counterweight trolley 434 can be reeved from the load trolley to the counterweight trolley by following the same reeving arrangement employed by either haulage cables 440 or 442. Other means such as a conventional takeup device or a lightweight synchronized boom can be employed to run a control cable from the cab to the boom motor drives on the gantry and to provide control power from the ship to the cab.

Referring now to the simplified hoist reeving diagram shown in FIG. 10, container carrying spreader 426 (FIG. 8) is supported from load trolley 424 by four load sheaves 480, 482, 484, 486 mounted on the spreader frame. Load sheaves 480, 486 are supported by hoist cables 488, 490, 492, 494, respectively, which are tied at one end to counterweight trolley 434 (points 450) and at the other to hoist drum 432.

Pairs of hoist cables 488, 494 and 490, 492 are reeved from the counterweight trolley to the hoist drum in a substantially identical manner and thus the reeving for only one cable of each pair will be described. Starting at counterweight trolley 434, cable 488 is reeved over sheave 496 on the gantry, sheaves 498, 500 on the right and left hand ends of boom 422, respectively, a sheave 502 on the load trolley, load sheave 480, a second sheave 504 on the load trolley, sheaves 506, 508 on the right and left hand ends of boom 423, respectively, a sheave 510 on the gantry, sheaves 512, 514 on the counterweight trolley and then to hoist drum 432. Cable 490, starting at the counterweight trolley, is reeved over a sheave 516 on the gantry, sheaves 518, 520 on the left and right hand ends of boom 423, respectively, a sheave 522 on the load trolley, load sheave 482, a second sheave 524 on the load trolley, sheaves 526, 528 on the left and right hand ends of boom 422, respectively, a sheave 530 on the gantry, sheaves 532, 534 on the counterweight trolley and then to hoist drum 432.

It will be apparent from the above description of the hoist reeving arrangement (FIG. 10) that when hoist drum 432 is driven counterclockwise, load sheaves 480—486 will be lowered and that when the drum is driven clockwise the load sheaves will be raised. It is noted that with the haulage reeving arrangement (FIG. 9) described above, load trolley 424 will be moved on the booms when counterweight trolley is racked on the gantry. By reeving each hoist cable over a pair of load trolley sheaves (at each load sheave) and then in opposite directions to sheaves at the outboard ends of the booms and back to sheaves at the inboard ends of the booms, the hoist cables will always remain of constant length and thus keep the load sheaves vertically stationary when either of the booms or the counterweight trolley is moved and irrespective of the relative degree of movement between the load and counterweight trolleys.

To level (or tilt) the load in either a fore and aft or athwartship direction, a leveling means (130) such as that shown in FIG. 4 and described previously can be incorporated into the hoist reeving arrangement shown in FIG. 10. This can be accomplished by slidably mounting either set of axially aligned gantry sheaves such as 496, 530 (and the other two unnumbered sheaves aligned therewith) and then fastening such slidably mounted sheaves to a set of leveling sheaves and a pair of leveling drums as shown in FIG. 4.

*Container Carrier Spreader*

The improved container carrying spreader 536 shown in FIGS. 11, 12, 13 and 14 can be used with any one of the three hoist and haulage reeving arrangements previously described, but for purposes of explanation it will be described with respect to the embodiment shown in FIG. 4. As explained previously, the spreader is hoisted and lowered to and from load trolley 24 by four hoist cables 82, 84, 86, 88 reeved over load sheaves 74, 76, 78, 80, respectively, mounted on the spreader frame. To properly align spreader 536 with a cargo container 538, such as a box car or truck body for example, a pair of centering arms 540, 542 are pivotally mounted on the spreader frame and extend downwardly at an angle therefrom when in extended position (FIGS. 12 and 13). Arms 540, 542 are adapted for engagement with guide means 544, 546 on container 538 to align the spreader with the container as the spreader is lowered into position (FIG. 14) for attachment thereto. As shown in FIGS. 13 and 14 arms 540, 542 can be locked up in retracted position by latches 541 and held in the desired retracted position by stop members 543.

The particular guide means utilized can take many forms. In the embodiment shown in FIGS. 11-14, guide means 544 and 546 include a pair of vertical side walls 548, 548 and a horizontal surface 550 formed as part of a recess in the top surface of container 538. Vertical walls 548, 548 converge towards each other and thereby cooperate with the horizontal surface 550 to guide the ends of the centering arms 540, 542 to a point 552 at which the vertical walls intersect. This centering action of arms 540, 542 in guide means 544, 546 serves to align spreader 536 with container 538 in the desired position (FIG. 14) to thereby facilitate the attachment of the spreader to the container for subsequent hoisting onto or off the ship.

FIGS. 15, 16 and 17 show some of the many alternative arrangements of guide means 554 and centering arms 556 which can be used. It is noted that either two (FIG. 17) or four (FIGS. 15 and 16) centering arms can be used. Furthermore, it should be noted that the vertical surfaces can either be made a part of a recess (FIGS. 11–14) or can be built up from the top surface of the container. The latter arrangement is not as desirable when stacking one container on the top of another.

Spreader 536 can be latched to container 538 by any one of several different arrangements and since this invention does not reside in any particular latching arrangement no specific structure is shown in the drawings or described herein.

Similarly, the means for operating the latches can take several forms. One such arrangement (FIG. 11) includes an auxiliary hoist drum 558 and a latching drive drum 560 mounted on the gantry. A pair of latching cables 562, 564 are reeved from drum 558 on the gantry to a latching drum 566 on the spreader by a sheave arrangement identical to the particular hoist reeving arrangement employed to raise and lower the spreader from the load trolley. Auxiliary hoist drum 558 is driven along with the hoist drum in the same direction but at half the linear speed thereof.

Latching drum 566 is operated to actuate the latching mechanism by a pair of movably mounted sheaves 568, 570 mounted on the gantry. Sheaves 568, 570 are moved in opposite directions to rotate latching drum 566 by means of latching drive drum 560 having a pair of oppositely wound control cables 572, 574 attached to the sheaves.

Although several embodiments of the present invention have been illustrated and described, it will be apparent to those skilled in the art that various changes and modifications may be made therein without departing from the spirit of the invention or from the scope of the appended claims.

I claim:

1. Cargo handling apparatus for a ship comprising, a gantry frame mounted on the ship, boom means slidably mounted on said gantry and adapted for athwartship movement thereon, boom drive means for moving said boom means athwartship on said gantry, a load trolley slidably mounted on said boom means for athwartship travel thereon, haulage means for moving said trolley athwartship along said boom means, load carrying means supported from said load trolley and adapted for vertical movement to and from said load trolley, hoist means for raising and lowering said load carrying means, and load leveling means adapted to tilt said load as desired to compensate for list or trim of the ship, said hoist means including a pair of hoist cables supporting said load carrying means, said load leveling means including a movably mounted sheave over which one of said hoist cables is reeved and means for moving said sheave to thereby move one of said cables with respect to the other.

2. Cargo handling apparatus for a ship comprising, a gantry frame mounted on the ship, a boom slidably mounted on said gantry and adapted for athwartship movement thereon, boom drive means for moving said boom athwartship on said gantry, a load trolley slidably mounted on said boom for athwartship travel thereon, haulage means for moving said trolley athwartship along said boom, a load carrying means supported from said load trolley and adapted for vertical movement to and from said load trolley, hoist means for raising and lowering said load carrying means, said haulage means including a pair of constant length haulage cables, said cables being dead-ended on the gantry, reeved over a sheave on each end of said boom and then dead-ended on said load trolley so that when said boom is driven athwartship on said gantry by said boom drive means said haulage means will cause said load trolley to travel athwartship on said boom in the same direction as said boom is moving.

3. Cargo handling apparatus according to claim 2 in which said hoist means includes a hoist cable adapted to support said load carrying means at one end thereof and wound at the other end on a hoist drum mounted on said gantry, said hoist cable being reeved from said hoist drum out to a sheave at one end of said boom and then back to a sheave on said load trolley.

4. Cargo handling apparatus for a ship comprising, a gantry frame mounted on the ship, a boom slidably mounted on said gantry adapted for athwartship movement thereon, a boom drive means mounted on said gantry for moving said boom athwartship of said gantry, a load trolley slidably mounted on said boom for athwartship travel thereon, haulage means for moving said trolley athwartship along said boom, load carrying means supported from said load trolley and adapted for vertical movement to and from said load trolley, hoist means for raising and lowering said load carrying means, said hoist means including a hoist drum and drive motor mounted on said gantry, an operator's cab mounted on said load trolley, said haulage means adapted to move said load trolley athwartship along said boom when said boom is driven athwartship on said gantry by said boom drive means, and control cable means running from said operator's cab on said load trolley to said hoist and boom drive units on said gantry, said control cable means including a constant length control cable reeved over a sheave mounted at one end of said boom and then to said gantry.

5. Cargo handling apparatus according to claim 4 in which said haulage means includes a pair of constant length haulage cables dead-ended on the gantry, reeved over a sheave on each end of said boom and then dead-ended on said load trolley.

6. Cargo handling apparatus for a ship comprising, a gantry frame mounted on the ship, a boom means slidably mounted on said gantry adapted for athwartship movement thereon, boom drive means for moving said boom means athwartship on said gantry, a load trolley slidably mounted on said boom means for athwartship travel thereon, haulage means for moving said trolley athwartship along said boom means, a load carrying means supported from said load trolley and adapted for vertical movement to and from said load trolley, hoist means for raising and lowering said load carrying means, and counterweight means adapted to counterbalance the load trolley as said load trolley is moved athwartship along said boom means, said counterweight means including a counterweight trolley slidably mounted for athwartship movement on said gantry, said counterweight trolley operatively connected to said load trolley and adapted to move said load trolley in one athwartship direction on said gantry when said counterweight trolley is moved in the opposite direction along said boom means.

7. Cargo handling apparatus according to claim 6 in which said haulage means for moving said load trolley athwartship along said boom includes a pair of haulage cables, said haulage cables being dead-ended on said load trolley and then reeved around sheaves mounted at opposite ends of said boom means and then dead-ended on said counterweight trolley.

8. Cargo handling apparatus according to claim 7 in which said hoist means includes a hoist drum mounted on said counterweight trolley and a hoist cable wound on said hoist drum, reeved over a sheave on one end of said boom means, a sheave on said load trolley, a sheave on said load carrying means, a second sheave on said load trolley, a sheave mounted on the other end of said boom means, and then dead-ended on said counterweight trolley.

9. Cargo handling apparatus for a ship comprising, a gantry frame mounted on the ship, a pair of booms slidably mounted on said gantry adapted for athwartship movement thereon, a boom drive means for each of said booms for moving said booms athwartship of said gantry to permit positioning one boom to partially counterbalance the other boom when loading and unloading cargo, a load trolley slidably mounted on said booms for athwartship travel thereon, haulage means for moving said load trolley athwartship along said booms, a load carrying means supported from said load trolley and adapted for vertical movement to and from said load trolley, hoist means for raising and lowering said load carrying means, and counterweight means adapted to counterbalance a load carried by said load carrying means as said load trolley is moved athwartship on a boom.

10. Cargo handling apparatus according to claim 9 in which said counterweight means includes a counterweight trolley slidably mounted on said gantry and adapted for movement in one athwartship direction on said gantry when said load trolley is moved in the other athwartship direction on a boom.

11. Cargo handling apparatus according to claim 10 in which said haulage means includes a pair of haulage cables, one of said haulage cables dead-ended on said counterweight trolley and then reeved over sheaves at the inboard and outboard ends of one of said booms and then dead-ended on said load trolley, the other of said cables being dead-ended on said counterweight trolley and then reeved over sheaves at the inboard and outboard ends of the other boom and then dead-ended on said load trolley.

12. Cargo handling apparatus according to claim 11 in which said hoist means includes a hoist drum mounted on said counterweight trolley and a hoist cable wound on said drum, said cable reeved over sheaves on the inboard and outboard ends of one of said booms, a sheave on said load trolley, a sheave on said load carrying means, a second sheave on said load trolley, sheaves on said outboard and inboard ends of the other boom, and then dead-ended on said counterweight trolley.

13. Material handling apparatus comprising, a support frame, a boom mounted on said frame, support means for slidably mounting said boom on said frame for substantially horizontal travel thereon, boom drive means for moving said boom on said frame, a load carrying member supported from one end of said boom, and hoist means adapted to raise and lower said load carrying member to and from said boom, said boom support means including a plurality of rollers mounted on said frame, said boom adapted to travel in contact with the bottom portion of a first roller located remote from said one end of said boom, said boom further adapted to travel in contact with only the top portion of all the other rollers located between said first roller and said one end of said boom.

14. Material handling apparatus according to claim 13 in which said boom has a pair of parallel, vertically spaced, horizontally extending flanges, both of said flanges adapted to move in contact with said first roller while only the upper flange lies in contact with said other rollers positioned between said first roller and said one end of said boom.

15. Material handling apparatus comprising, a support frame, a boom mounted on said frame, a container adapted for containing the material to be handled, a container carrying spreader frame supported from said boom and adapted for attachment to said container, hoist means for raising and lowering said spreader frame, centering means for said spreader frame adapted to align said frame with said container as said frame is lowered to the container for attachment thereto, said centering means including a plurality of centering arms pivotally mounted on said frame and extending downwardly at an angle therefrom, said centering means further including a guide means on said container for each of said centering arms, each of said centering arms adapted to engage a guide means and to be pivoted upwardly toward said spreader frame as said spreader is lowered on to a container and thereby align said spreader with said container for subsequent attachment thereto.

16. Material handling apparatus according to claim 15 in which each of said guide means includes a pair of vertical surfaces and a horizontal surface, said vertical surfaces positioned so that they converge towards each other.

17. Material handling apparatus according to claim 16 in which said vertical surfaces and horizontal surface are formed as part of a recess in the top surface of said container.

18. Cargo handling apparatus for a ship comprising, a gantry frame mounted on the ship, boom means slidably mounted on said gantry and adapted for athwartship movement thereon, boom drive means for moving said boom means athwartship on said gantry, a load trolley slidably mounted on said boom means for athwartship travel thereon, haulage means for moving said trolley athwartship along said boom means, said haulage means including a counterweight trolley mounted for athwartship travel on said gantry and operatively connected to said load trolley for moving said load trolley in response to movement of said counterweight trolley, load carrying means supported from said load trolley and adapted for vertical movement to and from said load trolley, and hoist means for raising and lowering said load carrying means.

19. Cargo handling apparatus according to claim 18 in which said haulage means further includes a pair of haulage cables dead-ended on said counterweight trolley then reeved over sheaves on opposite ends of said boom means and then dead-ended on said load trolley.

20. Cargo handling apparatus according to claim 19 in which said hoist means includes a hoist drum mounted on said counterweight trolley and a hoist cable wound on said drum, said cable reeved from said drum to a sheave at one end of said boom means, then to said load trolley and from said load trolley to a sheave at the other end of said boom means and then back to said counterweight trolley where it is dead-ended.

21. Cargo handling apparatus according to claim 20 in which said hoist means further includes a pair of sheaves on said load trolley over which said hoist cable is reeved.

22. Load leveling apparatus for material handling apparatus including a support member, a load carrying spreader frame supported from said support member, and hoist means for raising and lowering said load carrying spreader frame, said hoist means including four hoist cables fastened to said spreader frame at four rectangularly spaced points comprising a first set of four movably mounted leveling sheaves over which said hoist cables are reeved, and control means for moving said sheaves in selected pairs to thereby facilitate both athwartship and fore and aft tilting of said spreader frame as desired.

23. Load leveling apparatus according to claim 22 in which said control means includes a pair of leveling drums and a second set of four movably mounted leveling sheaves operatively connected to said first set, said drums adapted when rotated to move said second set of sheaves in selected pairs which in turn will move said first set of sheaves to thereby provide both athwartship and fore and aft tilting of said spreader frame as desired.

24. Cargo handling apparatus for a ship comprising, a boom support structure, a boom slidably mounted on said boom support structure and adapted for athwartship movement thereon, boom drive means for moving said boom athwartship on said boom support structure, a load trolley slidably mounted on said boom for athwartship travel thereon, haulage means for moving said trolley athwartship along said boom, a load carrying means supported from said load trolley and adapted for vertical movement to and from said load trolley, hoist means for raising and lowering said load carrying means, said haulage means including a pair of constant length haulage cables, said cables being dead-ended on said boom support structure, reeved over a sheave on each end of said boom and then dead-ended on said load trolley so that when said boom is driven athwartship on said boom support structure by said boom drive means said haulage means will cause said load trolley to travel athwartship on said boom in the same direction as said boom is moving.

References Cited in the file of this patent
UNITED STATES PATENTS

| | | |
|---|---|---|
| 474,494 | Brown | May 10, 1892 |
| 655,522 | Seaver et al. | Aug. 7, 1900 |
| 2,541,893 | Speer | Feb. 13, 1951 |
| 2,555,297 | Smith et al. | May 29, 1951 |
| 2,707,053 | Browning | Apr. 26, 1955 |
| 2,963,310 | Abolins | Dec. 6, 1960 |